(12) United States Patent
Lewis et al.

(10) Patent No.: US 10,164,909 B2
(45) Date of Patent: Dec. 25, 2018

(54) SYSTEM AND METHOD FOR PROVIDING DYNAMIC PERSONALITIES FOR NETWORK PORTS

(71) Applicant: Dell Products, LP, Round Rock, TX (US)

(72) Inventors: Jonathan F. Lewis, Pflugerville, TX (US); Hendrich M. Hernandez, Round Rock, TX (US); Wade Andrew Butcher, Cedar Park, TX (US); Kevin A. Hughes, Cedar Park, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 599 days.

(21) Appl. No.: 14/581,308

(22) Filed: Dec. 23, 2014

(65) Prior Publication Data
US 2016/0182689 A1   Jun. 23, 2016

(51) Int. Cl.
*H04L 12/935* (2013.01)
*H04L 12/931* (2013.01)
*H04L 29/06* (2006.01)

(52) U.S. Cl.
CPC ........ *H04L 49/3009* (2013.01); *H04L 49/602* (2013.01); *H04L 69/18* (2013.01); *H04L 49/351* (2013.01)

(58) Field of Classification Search
CPC . H04L 49/3009; H04L 49/351; H04L 49/602; H04L 69/08; H04L 69/18; H04L 69/22; H04L 12/2836; H04L 12/66; H04L 29/06068; H04L 29/06224; H04L 51/06; H04L 67/2823; H04M 7/1205
See application file for complete search history.

(56) References Cited

U.S. PATENT DOCUMENTS

| | | | |
|---|---|---|---|
| 6,400,729 B1 * | 6/2002 | Shimadoi | H04L 69/08 370/466 |
| 6,505,255 B1 * | 1/2003 | Akatsu | H04L 12/66 370/351 |
| 7,133,416 B1 * | 11/2006 | Chamdani | H04L 12/66 370/352 |
| 7,231,535 B2 | 6/2007 | Le Creff et al. | |
| 7,349,407 B1 * | 3/2008 | Takamatsuya | H04L 29/06 370/395.5 |
| 8,812,760 B1 * | 8/2014 | Bamford | G06F 5/065 710/110 |

(Continued)

*Primary Examiner* — Joshua Kading
(74) *Attorney, Agent, or Firm* — Larson Newman, LLP

(57) ABSTRACT

A network adapter, includes a first transceiver module with a transceiver that operates according to a first network protocol and a memory element that includes information that identifies the first network protocol, a second transceiver module with a transceiver that operates according to a second network protocol and a memory element that includes information that identifies the second network protocol, and a controller that reads the information from the first memory element, directs an information handling system to invoke a first network driver associated with the first network protocol based upon the information, reads the second information from the second memory element, and directs the information handling system to invoke a second network driver associated with the second network protocol based upon the second information.

14 Claims, 5 Drawing Sheets

(56) References Cited

U.S. PATENT DOCUMENTS

| | | | |
|---|---|---|---|
| 2004/0090987 A1* | 5/2004 | Doidge | H04L 12/5601 370/467 |
| 2005/0110618 A1 | 5/2005 | Le Creff et al. | |
| 2005/0276278 A1* | 12/2005 | Jung | H04L 69/18 370/466 |
| 2006/0015673 A1* | 1/2006 | Morrow | G06F 13/387 710/315 |
| 2006/0165121 A1* | 7/2006 | MacDonald | H04L 12/46 370/466 |
| 2006/0209886 A1* | 9/2006 | Silberman | H01R 31/065 370/466 |
| 2009/0003381 A1* | 1/2009 | Shamilian | H04L 69/22 370/467 |
| 2013/0210275 A1* | 8/2013 | Fish | H01R 13/6658 439/620.01 |
| 2014/0115194 A1 | 4/2014 | Qu | |

\* cited by examiner

SYSTEM AND METHOD FOR PROVIDING DYNAMIC PERSONALITIES FOR NETWORK PORTS

FIELD OF THE DISCLOSURE

This disclosure generally relates to information handling systems, and more particularly relates to providing dynamic personalities for network ports.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
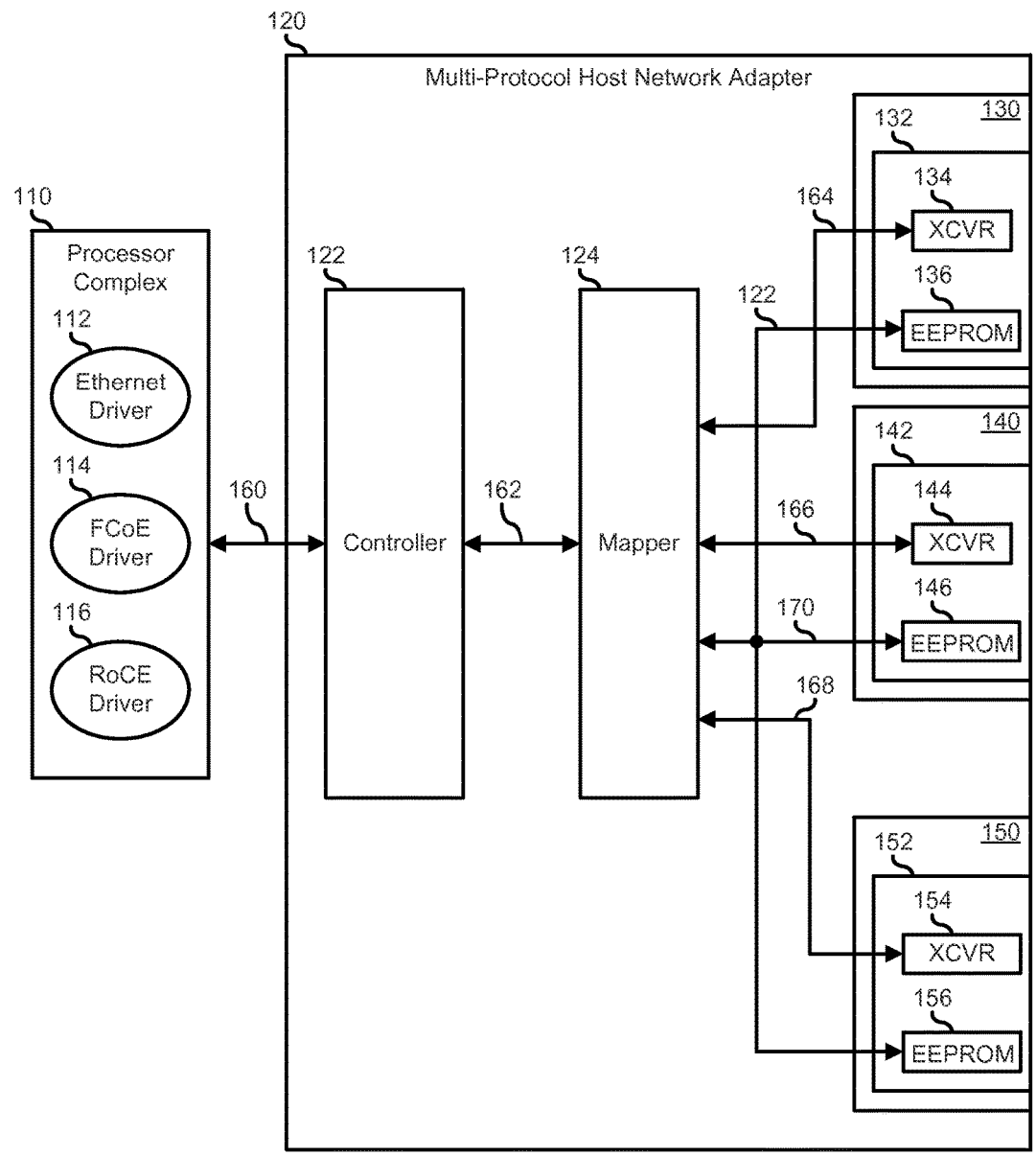
FIG. 1 is a block diagram illustrating an information handling system with a multi-protocol host network adapter according to an embodiment of the present disclosure.

FIG. 1 illustrates an embodiment of an information handling system 100. For purpose of this disclosure information handling system 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a processor complex 110 and a multi-protocol host network adapter (HNA) 120. Processor complex 110 represents a set of elements of information handling system 100 that includes one or more processor, system memory, and input/output (I/O) processing hardware. Processor complex 110 includes an operational environment, such as a Basic Input/Output System (BIOS), or an Universal Extensible Firmware Interface (UEFI), that operates to load and install various device drivers, device firmware, option ROM, Application Programming Interfaces (APIs), and the like to enable information handling system 100 to perform such tasks as are needed or desired. In particular, processor complex 110 operates to launch one or more network communication drivers, such as an Ethernet driver 112, a FibreChannel over Ethernet (FCoE) driver 114, and a Remote Direct Memory Access (RDMA) over Converged Ethernet (RoCE) driver 116. The skilled artisan will recognize that the particular network communication drivers as illustrated herein are exemplary, and that drivers for other network communication protocols can be substituted for the illustrated network communication drivers 112, 114, and 116, or can be provided on processor complex 110 in addition to drivers 112, 114, and 116.

Ethernet driver 112 operates to provide for network communications between information handling system 100 and an attached network device via an Ethernet standard. As such, Ethernet driver 112 operates to receive various network control and data commands from processor complex 110, to convert the network control and data commands into Ethernet packets, and to forward the Ethernet packets to HNA 120 for transmission to the attached network device. Ethernet driver 112 also operates to receive various Ethernet packets, that is, network control and data packets, from the attached network device via HNA 120, and to provide the network control and data commands to processor complex 110. Similarly, FCoE driver 114 operates to provide for network communications between information handling system 100 and an attached network device that conforms with a FibreChannel standard, and RoCE driver 114 operates to provide for network communications between information handling system 100 and an attached network device that conforms with an RDMA standard. The skilled artisan will recognize that one or more of drivers 112, 114, and 116 can be utilized for one or more similar network communication activities, or that various combinations of drivers can be used together, as needed or desired. For example Ethernet driver 112 can be utilized with a FibreChannel driver to receive FibreChannel packets, and to condition the FibreChannel packets into Ethernet type packets for communication over an Ethernet network, or can be utilized to manage Internet Small Computer System Interface (iSCSI) network traffic.

HNA 120 operates to provide network connectivity for information handling system 100 such that programs, software, Application Programming Interfaces (APIs), and other executable code can access resources on one or more networks that are connected to the HNA. In particular, HNA 120 operates to receive network control and data packets from drivers 112, 114, and 116 via a host bus interface 160 that connects processor complex 110 to the HNA and to forward the packets to one of the several networks, and to receive network control and data packets from the networks and to forward the packets to the drivers via the host bus interface. An example of host bus interface 160 includes a Peripheral Component Interconnect-Express (PCIe) interface or another high-bandwidth data interface, as needed or desired.

HNA 120 includes a controller 122, a mapper 124, a Small Form Factor (SFF) connector 130, a SFF connector 140, and one or more additional SFF connector 150, also sometimes referred to as SFF cages. Controller 122 is connected to processor complex 110 via host bus interface 160, and to mapper 124 via a Media Access Control/Physical Layer (MAC/PHY) interface 162. SFF connectors 130, 140, and 150 operate to provide a standard interface into which SFF pluggable modules are installed to provide a physical and electrical connection to one or more associated networks. As such, SFF connector 130 includes a SFF module 132 that further includes a transceiver 134 and an Electrically Erasable Programmable Read-Only Memory (EEPROM) 136, SFF connector 140 includes a SFF module 142 that further includes a transceiver 144 and an EEPROM 146, and SFF connector 150 includes a SFF module 152 that further includes a transceiver 154 and an EEPROM 156. Transceivers 134, 144, and 154 operate to provide a physical and electrical, or in the case of optical fibre interfaces, optical, connectivity to the one or more networks for sending and receiving control and data packets, and are connected to mapper 124 via respective serial interfaces. As such, mapper 124 is connected to transceiver 134 via a serial interface 164, to transceiver 144 via a serial interface 166, and to transceiver 154 via a serial interface 168. An example of SFF modules 132, 142, and 152 includes one or more of an Ethernet SFF module, such as a 10 gigabit (Gb) Ethernet SFF module or a 100 Gb Ethernet SFF module, a Fibre-Channel SFF module, a RDMA SFF module, and InfiniBand SFF module, or another SFF module, as needed or desired. EEPROMs 136, 146, and 156 operate to provide basic information regarding respective SFF modules 132, 142, and 152, such as physical and electrical/optical connection type, transceiver speed, and other basic information, as needed or desired. EEPROMs 136, 146, and 156 are accessed via a two-wire interface 170 to provide the basic information regarding the respective SFF modules 132, 142, and 152. In particular, EEPROMs 136, 146, and 156 are connected to mapper 124 via two-wire interface 170.

HNA 120 operates as a flexible multi-protocol device that adaptably configures itself to handle network traffic of different types based upon the types of SFF modules 132, 142, and 152 that populate the respective SFF connectors 130, 140, and 150. In this way, information handling system 100 can operate in diverse network environments without the need for separate network adapters for each network environment, and can provide network redundancy without multiplying the number of needed network adapters by the number of network environments. For example, where a configuration calls for a redundant Ethernet connection, a redundant FibreChannel connection, and a redundant InfiniBand connection, information handling system 100 can be configured with a first HNA 120 that is populated with an Ethernet SFF module, a FibreChannel SFF module, and an InfiniBand SFF module to meet the connectivity requirement, and can be configured with a second HNA that is populated similarly to the first HNA to meet the redundancy requirement. In such a configuration, information handling system 100 would include two (2) HNAs. In contrast, a conventional confirmation would require two Ethernet adapters, two FibreChannel adapters, and two Infiniband adapters, for a total of six (6) network adapters.

In addition, the adaptable configuration of HNA 120 is performed automatically based upon the types of installed SFF modules 132, 142, and 152. Here, when HNA 120 is powered on, controller 122 operates to detect the types of the installed SFF modules 132, 142, and 152 by reading EEPROMs 136, 146, and 156 via two-wire interface 170. Then, when processor complex 110 initializes HNA 120, controller 122 operates to provide the SFF module type information for SFF modules 132, 142, and 152 to the processor complex, and invokes the processor complex to install the requisite drivers 112, 114, and 116 that are needed to communicate network control and data packets with the associated networks. In particular, where host bus interface 160 represents a PCIe interface, controller 122 can present a separate PCI function for each installed SFF module 132, 142, and 152, where each PCI function identifies the type of the associated SFF module. Controller 122 also operates to set ingress and egress ports of mapper 124 to the proper protocol, that is, to the protocol associated with each particular SFF module 132, 142, and 152. In a particular embodiment, after power on and initial configuration of HNA 120, mapper 124 operates to direct the control and data packet flows to the correct SFF module 132, 142, or 152, based upon the particular PCI function that is invoked by drivers 112, 114, or 116 for the control and data packet flows.

HNA 120 permits for simplified factory configuration of information handling system 100. Here, a common type of SFF module, such as an Ethernet SFF module, can be installed for manufacturing operations, allowing the populated port to function as a Pre-boot eXecution Environment (PXE) boot port for factory download and installation. Then, the common type of SFF module can be removed prior to shipment, and an end user can reconfigure the operation of HNA 120 by repopulating SFF connectors 130, 140, and 150 as needed or desired.

Figure 2:
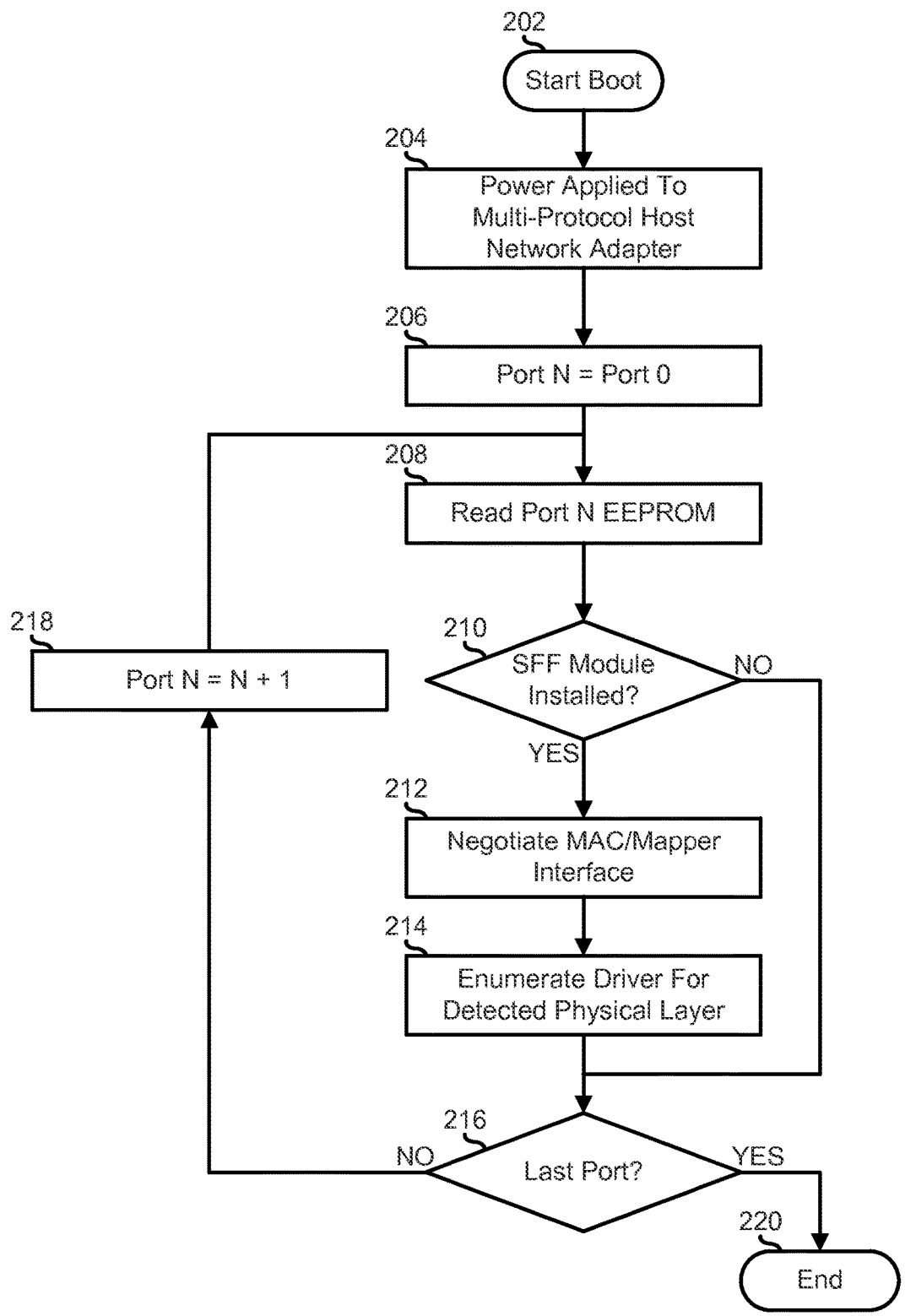
FIG. 2 illustrates a method of providing dynamic personalities for network ports in a multi-protocol host network adapter according to an embodiment of the present disclosure.

FIG. 2 illustrates a method for providing dynamic personalities for network ports starting with a power-on, or boot, of an information handling system, such as information handling system 100, in block 202. Power is applied to a multi-protocol HNA of the information handling system, such as HNA 120, in block 204. A first port, that is, port-0, is selected in block 206, and an EEPROM of a SFF module in the first port is read in block 208. A decision is made as to whether or not the first port is populated with a SFF module in decision block 210. If so, the "YES" branch of decision block 210 is taken, a MAC/mapper interface is negotiated for the detected SFF module in block 212, and an associated driver is enumerated for the detected physical layer of the SFF module in block 214. A decision is made as to whether or not the selected port is the last port on the HNA in decision block 216. If not, the "NO" branch of decision block 216 is taken, the next port is selected in block 218, and the method returns to block 208, where the EEPROM of the SFF module in the next port is read. If the selected port is the last port on the HNA, the "YES" branch of decision block 216 is taken and the method ends in block 220. Returning to decision block 210, if the selected port is not populated with a SFF module, the "NO" branch of the decision block is taken and the method proceeds to decision block 216 where a decision is made as to whether or not the selected port is the last port on the HNA.

Figure 3:
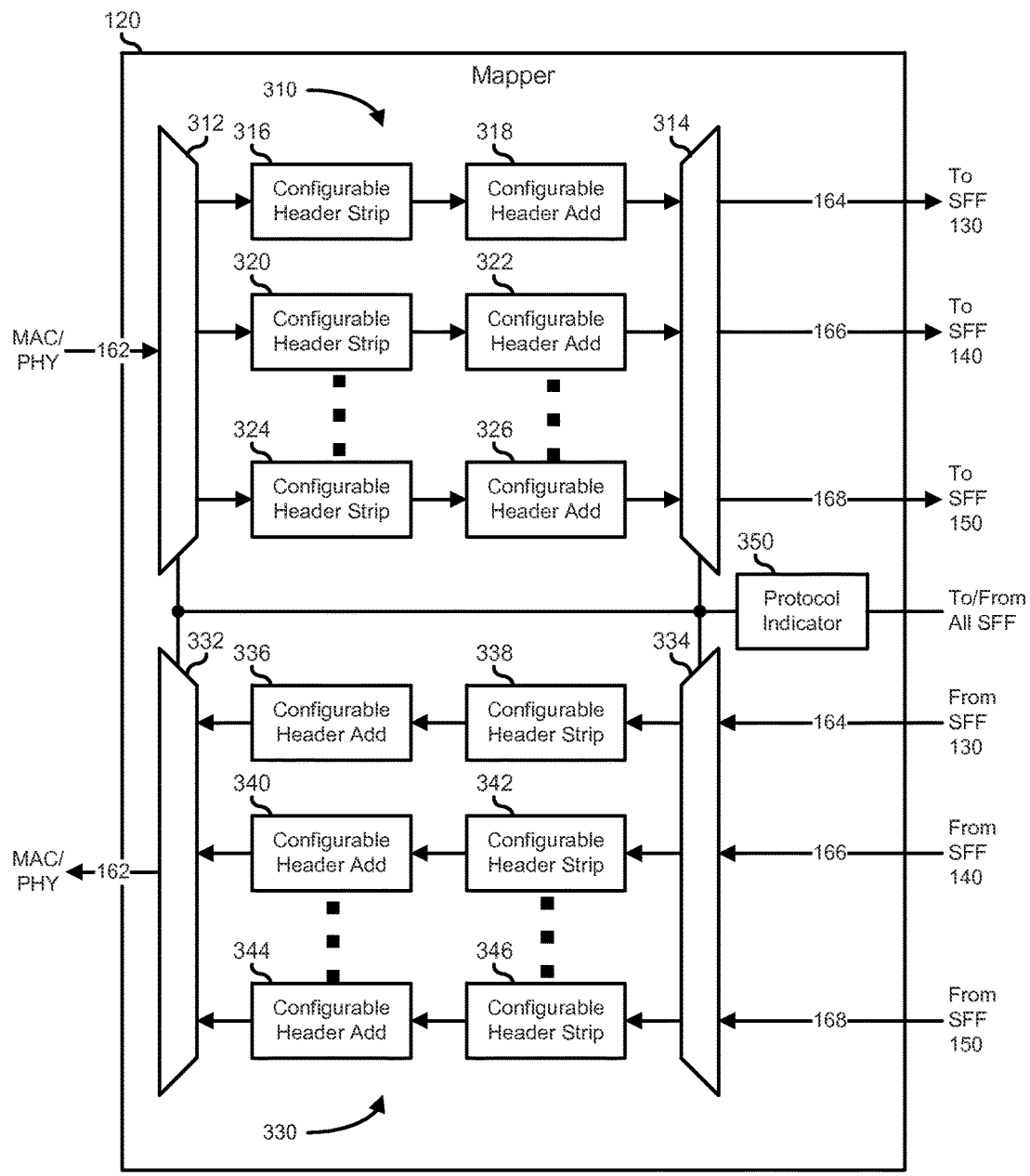
FIG. 3 is a block diagram of an embodiment of a port mapper of the multi-protocol host network adapter of FIG. 1.

FIG. 3 illustrates a particular embodiment of mapper 120, including an egress channel 310, and ingress channel 330, and a protocol indicator 350. Egress channel 310 includes an input switch 312, an output switch 314, a first protocol channel including a configurable header stripper 316 and a configurable header adder 318, a second protocol channel including a configurable header stripper 320 and a configurable header adder 322, and one or more additional protocol channels including a configurable header stripper 324 and a configurable header adder 326. Ingress channel 330 includes an output switch 332, an input switch 334, a first protocol channel including a configurable header adder 336 and a configurable header stripper 338, a second protocol channel including a configurable header adder 340 and a configurable header stripper 342, and one or more additional protocol channel including a configurable header adder 344 and a configurable header stripper 346. Egress channel 310 receives network control and data packets from MAC/PHY 162, and input switch 312 routes the packets to the associated stripper 316, 320, or 324 that is permanently configured to strip header information from the data packets, the associated data is provided to the associated adder 318, 322, or 326 to add the header information for the type of network data traffic that the data is targeted to, and a new data packet is provided via output switch 314 to the associated serial interface 164, 166, or 168 to the connected SFF module 130, 140, or 150. For example, where MAC/PHY 162 is an Ethernet interface, and the data packets are targeted to a FibreChannel network connected to SFF module 140, the data packets will be provided to stripper 320 in the second channel, that is, the channel associated with the SFF module to have Ethernet header information stripped from the packet. The data will then be provided to adder 322 to have FibreChannel header information added, for communication to the FibreChannel network via the SFF module. Ingress channel 330 operates similarly to egress channel 310. Strippers 316, 320, 324, 338, 342, and 346, and adders 318, 322, 326, 336, 340, and 344 are configurable in that the stripping operations and adding operations will be determined by the type of SFF module 130, 140, or 150 that is associated with the particular protocol channels, and can be configured to provide the requisite function upon power up of HNA 120, when the types of the SFF modules is determined.

Figure 4:
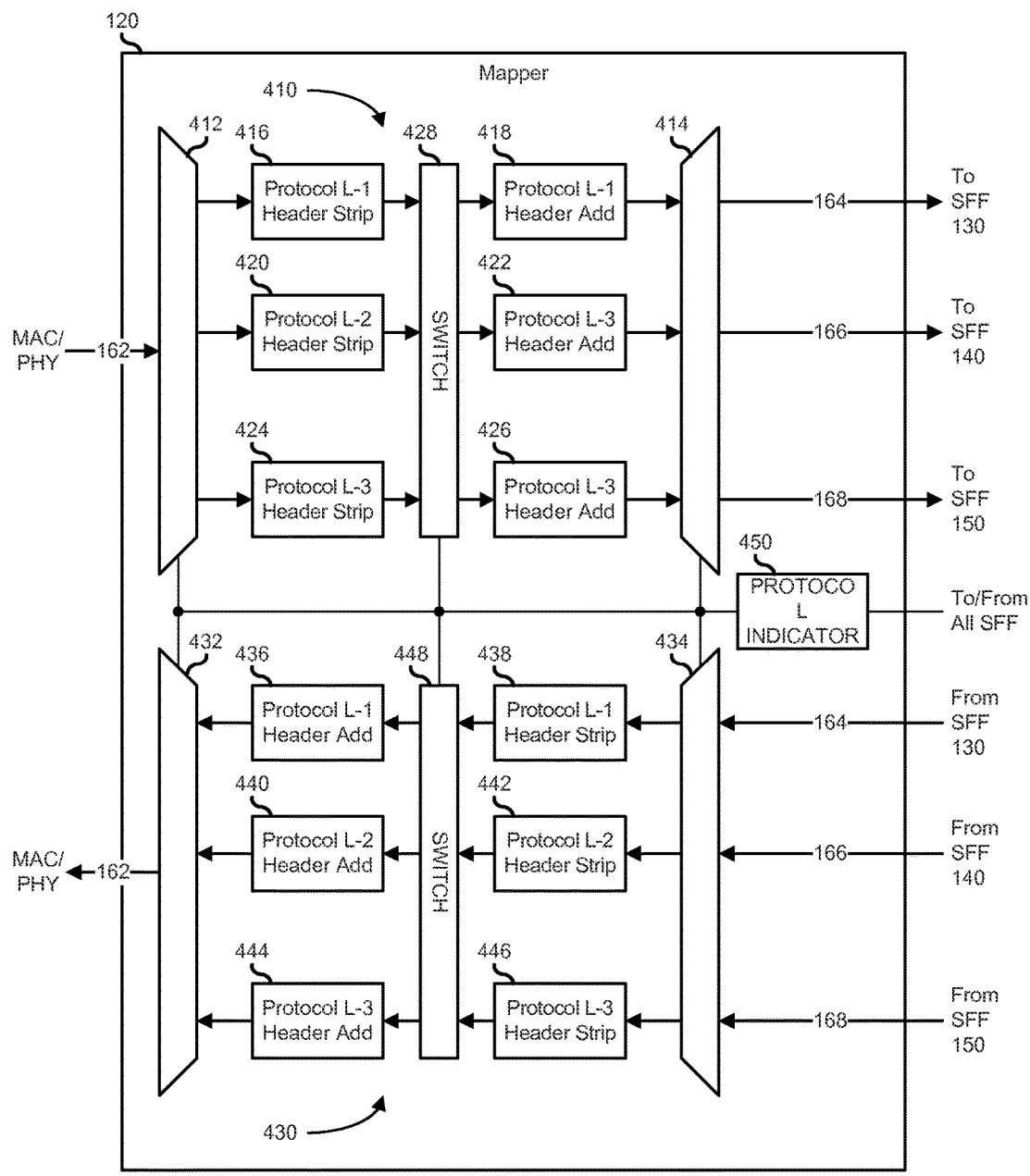
FIG. 4 is a block diagram of another embodiment of a port mapper of the multi-protocol host network adapter of FIG. 1.

FIG. 4 illustrates another embodiment of mapper 120, including an egress channel 410, and ingress channel 430, and a protocol indicator 450. Egress channel 410 includes an input switch 412, an output switch 414, a first protocol channel including a protocol header stripper 416 and a protocol header adder 418, a second protocol channel including a protocol header stripper 420 and a protocol header adder 422, one or more additional protocol channel including a protocol header stripper 424 and a protocol header adder 426, and a protocol switch 428. Ingress channel 430 includes an output switch 432, an input switch 434, a first protocol channel including a protocol header adder 436 and a protocol header stripper 438, a second protocol channel including a protocol header adder 440 and a protocol header stripper 442, one or more additional protocol channel including a protocol header adder 444 and a protocol header stripper 446, and a protocol switch 448. Egress channel 410 receives network control and data packets from MAC/PHY 162, and input switch 412 routes the packets to the associated stripper 416, 420, or 424 that is permanently configured to strip header information from the data packets, the associated data is routed by protocol switch 428 to the associated adder 418, 422, or 426 that is permanently configured to add header information for the type of network data traffic that the data is targeted to, and the new data packet is provided via output switch 414 to the associated serial interface 164, 166, or 168 to the connected SFF module 130, 140, or 150. For example, where MAC/PHY 162 is an Ethernet interface, and the data packets are targeted to a FibreChannel network connected to SFF module 140, the data packets will be provided to the associated stripper 416, 420, or 424 that is permanently configured to strip Ethernet headers from Ethernet packets, that is, to whichever channel is configured to handle Ethernet packets. The data will then be switched by protocol switch 428 428 to the associated adder 418, 422, or 426 that is permanently configured to add FibreChannel header information to the data packet, and switch 414 switches the FibreChannel packets to the FibreChannel network via the SFF module. Ingress channel 430 operates similarly to egress channel 410. Strippers 416, 420, 424, 438, 442, and 446, and adders 418, 422, 426, 436, 440, and 444 are permanently configured to provide the various stripping operations and adding operations.

In a particular embodiment, mapper 120 operates to examine each incoming packet to determine the protocol associated with the packet. Mapper 120 then strips off the header of the packet and looks up a mapped protocol for the target of the packet and loads a preprogrammed header template for the target protocol and converts the incoming packet to the target type using the associated template. In a particular embodiment, the stripper operates using the following pseudo-code:

```
Mapper Logic

IncomingProtocol = Read from Protocol Indicator
MappedProtocol = Read from Negotiated MAC/Mapper Interface Table
switch (incomingProtocol)
{
  case (IB):
    switch (MappedProtocol)
    {
      case (FC):
        load FC template
        convert IB to FC
        break;
      case (iSCSI):
        load iSCSI template
        convert IB to iSCSI
        break;
      case (Ethernet):
        load Ethernet template
        convert IB to Ethernet
        break;
      case (IB):
        default:
          pass header through unchanged
          convert IB to FC
        break;
    }
  case (FC):
    ...
```

Figure 5:
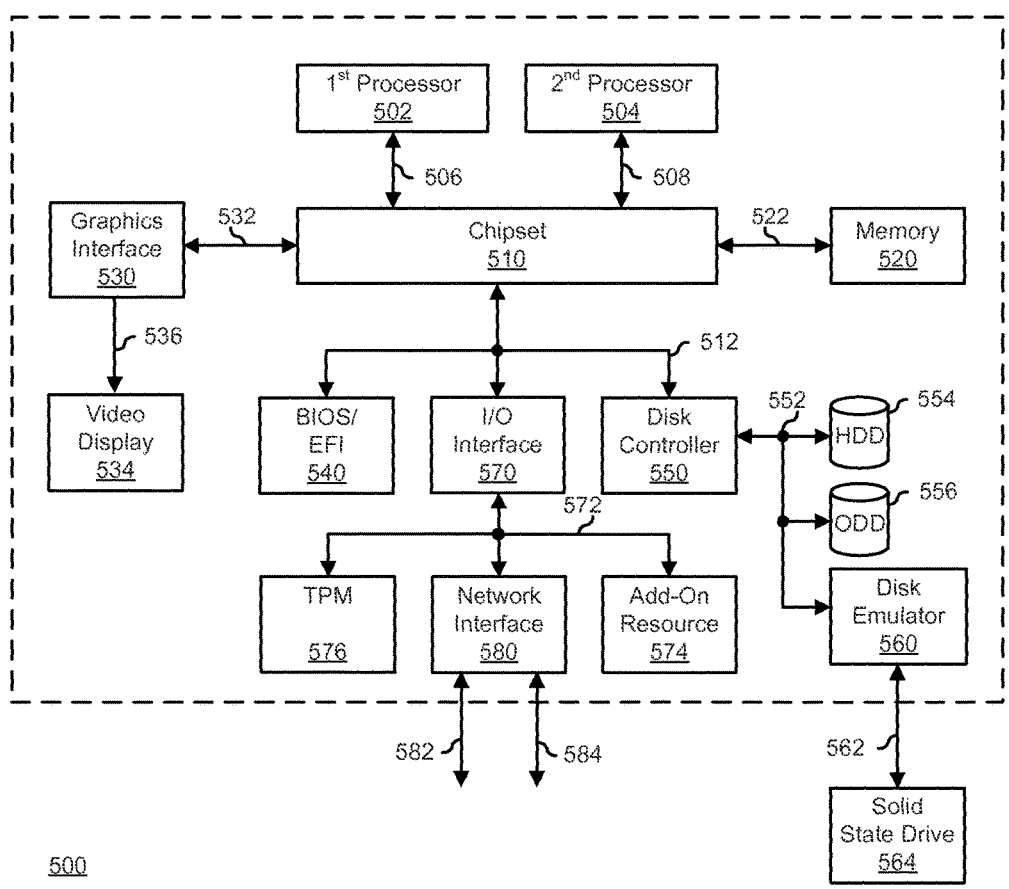
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels. Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network adapter installable into an information handling system, the network adapter comprising:
    a first transceiver module installed in a first module connector and that includes:
        a first transceiver that is coupleable to a first network and that operates according to a first network protocol; and
        a first memory element that includes first information that identifies the first network protocol;
    a second transceiver module installed in a second module connector and that includes:
        a second transceiver that is coupleable to a second network and that operates according to a second network protocol; and
        a second memory element that includes second information that identifies the second network protocol;
    a host bus interface that couples a processor complex of the information handling system to a controller of the network adapter, wherein, in response to power being applied to the network adapter the controller:
        reads the first information from the first memory element;
        directs the information handling system to invoke a first network driver associated with the first network protocol based upon the first information;
        reads the second information from the second memory element; and
        directs the information handling system to invoke a second network driver associated with the second network protocol based upon the second information; and
    a mapper that includes;
        a first protocol channel associated only with the first module connector, the first protocol channel including a first configurable header stripper coupled to a first configurable header adder; and
        a second protocol channel associated only with the second module connector, the second protocol channel including a second configurable header stripper coupled to a second configurable header adder, wherein the mapper examines incoming packets to determine a protocol associated with the incoming packets, strips off a header of the incoming packets, looks up a mapped protocol for a target of the incoming packets, loads a preprogrammed header template for the target protocol, and converts the incoming packets to the target type using the associated template.

2. The network adapter of claim 1, wherein the controller further:
    detects that the first transceiver module has been removed from the first module connector;
    detects that a third transceiver has been installed in the first module connector, wherein the third transceiver includes;
        the third transceiver that is coupleable to a third network and that operates according to a third network protocol; and
        a third memory element that includes third information that identifies the third network protocol;
    reads the third information from the third memory element;
    directs the information handling system to invoke a third network driver associated with the third network protocol based upon the third information.

3. The network adapter of claim 1, wherein the first network protocol is the same as the second network protocol, and the first network driver is the same as the second network driver.

4. The network adapter of claim 1, wherein the first network protocol is different from the second network protocol, and the first network driver is different from the second network driver.

5. The network adapter of claim 1, wherein the first transceiver module and the second transceiver module are Small Form Factor Pluggable transceiver modules.

6. The network adapter of claim 1, wherein the network adapter:
    receives, via the host bus interface, a first data packet that is targeted to the first network;
    routes the first data packet to the first transceiver;
    receives, via the host bus interface, a second data packet that is targeted to the second network; and
    routes the second data packet to the second transceiver.

7. The network adapter of claim 1, wherein:
    the first configurable header stripper strips off a first packet header from the first data packet; and
    the first configurable header adder adds a second packet header to the first data packet after the first configurable header stripper strips off the first packet header from the first data packet, the second packet header being associated with the first network protocol.

8. The network adapter of claim 7, wherein:
the second configurable header stripper further strips off a third packet header from the second data packet; and
the second configurable header adder adds a fourth packet header to the second data packet after the second configurable header stripper strips off the third packet header from the second data packet, the fourth packet header being associated with the second network protocol.

9. A method, comprising:
reading, by a controller of a network adapter, first information from a first memory element of a first transceiver module of the network adapter, wherein the first information identifies a first network protocol associated with the first transceiver module;
directing an information handling system that includes the network adapter to invoke a first network driver associated with the first network protocol based upon the first information;
reading, by the controller, second information from a second memory element of a second transceiver module of the network adapter, wherein the second information identifies a second network protocol associated with the second transceiver module;
directing the information handling system to invoke a second network driver associated with the second network protocol based upon the second information;
routing, by a mapper of the network adapter, a first data packet from the information handling system to the first transceiver module via a first protocol channel of the mapper that is associated only with the first module connector, the first protocol channel including a first configurable header stripper coupled to a first configurable header adder;
routing, by the mapper, a second data packet from the information handling system to the second transceiver module via a second protocol channel of the mapper that is associated only with the second module connector, the second protocol channel including a second configurable header stripper coupled to a second configurable header adder;
examining, by the mapper, incoming packets to determine a protocol associated with the incoming packets;
stripping off, by the mapper, a header of the incoming packets;
looking up, by the mapper, a mapped protocol for a target of the incoming packets;
loading by the mapper, a preprogrammed header template for the target protocol; and
converting, by the mapper, the incoming packets to the target type using the associated template.

10. The method of claim 9, further comprising:
detecting that the first transceiver module has been removed from the network adapter;
detecting that a third transceiver has been installed in the network adapter;
reading, by the controller, third information from a third memory element of the third transceiver module via the two-wire interface, wherein the third information identifies a third network protocol associated with the third transceiver module;
directing the information handling system to invoke a third network driver associated with the third network protocol based upon the third information.

11. The method of claim 9, further comprising:
stripping, by the first configurable header stripper, a first packet header from the first data packet; and
adding, by the first configurable header adder, a second packet header to the first data packet after the first configurable header stripper strips off the first packet header from the first data packet, the second packet header being associated with the first network protocol.

12. The method of claim 11, further comprising:
stripping, by the second configurable header stripper, a third packet header from the second data packet; and
adding, by the second configurable header adder, a fourth packet header to the second data packet after the first configurable header stripper strips off the third packet header from the second data packet, the fourth packet header being associated with the second network protocol.

13. A non-transitory computer-readable medium including code for performing a method, the method comprising:
reading, by a controller of a network adapter, first information from a first memory element of a first transceiver module of the network adapter, wherein the first information identifies a first network protocol associated with the first transceiver module;
directing an information handling system that includes the network adapter to invoke a first network driver associated with the first network protocol based upon the first information;
reading, by the controller, second information from a second memory element of a second transceiver module of the network adapter, wherein the second information identifies a second network protocol associated with the second transceiver module;
directing the information handling system to invoke a second network driver associated with the second network protocol based upon the second information; and
routing, by a mapper of the network adapter, a first data packet from the information handling system to the first transceiver module via a first protocol channel of the mapper that is associated only with the first module connector, the first protocol channel including a first configurable header stripper coupled to a first configurable header adder;
routing, by the mapper, a second data packet from the information handling system to the second transceiver module via a second protocol channel of the mapper that is associated only with the second module connector, the second protocol channel including a second configurable header stripper coupled to a second configurable header adder;
examining, by the mapper, incoming packets to determine a protocol associated with the incoming packets;
stripping off, by the mapper, a header of the incoming packets;
looking up, by the mapper, a mapped protocol for a target of the incoming packets;
loading, by the mapper, a preprogrammed header template for the target protocol; and
converting, by the mapper, the incoming packets to the target type using the associated template.

14. The computer-readable medium of claim 13, the method further comprising:
detecting that the first transceiver module has been removed from the network adapter;
detecting that a third transceiver has been installed in the network adapter;
reading, by the controller, third information from a third memory element of the third transceiver module via the two-wire interface, wherein the third information identifies a third network protocol associated with the third transceiver module;
directing the information handling system to invoke a third network driver associated with the third network protocol based upon the third information.

\* \* \* \* \*